(12) United States Patent
Rooney

(10) Patent No.: US 6,382,130 B1
(45) Date of Patent: May 7, 2002

(54) POSITIONER FOR MILKING APPARATUS

(76) Inventor: Tim M. Rooney, Rte. 1, Box 75, Steuben, WI (US) 54657

( * ) Notice: Subject to any disclaimer, the term of this patent is extended or adjusted under 35 U.S.C. 154(b) by 0 days.

(21) Appl. No.: 09/441,397

(22) Filed: Nov. 16, 1999

(51) Int. Cl.[7] .............................. A01J 3/00; A01J 5/00
(52) U.S. Cl. .................. 119/14.04; 119/14.01
(58) Field of Search ................ 119/14.01, 14.02, 119/14.03, 14.04, 14.1, 14.18, 14.54

(56) References Cited

U.S. PATENT DOCUMENTS

| | | |
|---|---|---|
| 876,598 A | 1/1908 | Sharples |
| 3,593,687 A | 7/1971 | Clegg |
| 3,603,292 A | 9/1971 | Finch |
| 3,605,694 A | 9/1971 | Thomas et al. |
| 3,929,103 A | 12/1975 | Schluckbier |
| 3,931,794 A | 1/1976 | Chillingworth |
| 3,938,470 A | 2/1976 | Pace |
| 3,999,516 A | 12/1976 | Shulick |
| 4,228,763 A * | 10/1980 | Heidecker et al. ....... 119/14.08 |
| 4,586,462 A | 5/1986 | Icking |
| 5,809,931 A | 9/1998 | Ellis et al. |
| 5,865,138 A | 2/1999 | van der Lely |

* cited by examiner

*Primary Examiner*—Charles T. Jordan
*Assistant Examiner*—Judith A. Nelson
(74) *Attorney, Agent, or Firm*—Craig A. Fieschko, Esq.; DeWitt Ross & Stevens S.C.

(57) ABSTRACT

A milking siphon positioner for repositioning milking equipment within a milking parlor is shown and described. A swing arm is pivotally mounted within a bearing so that it may swing in a swing arc defined in a plane which is at least substantially vertical. A milking siphon suitable for attachment to an animal's teats is carried on the swing arm so that it is repositioned by the swing arm; for example, the swing arm may reposition the milking siphon to milking platforms situated on opposite sides of milking parlors. The swing arm may be selectively affixed with respect to the bearing at selected angles within the swing arc, so that the swing arm (and milking siphon) can be locked into desired positions.

20 Claims, 3 Drawing Sheets

POSITIONER FOR MILKING APPARATUS

FIELD OF THE INVENTION

This disclosure concerns an invention relating generally to apparata for use in animal milking parlors, and more specifically to positioners for easily relocating milking apparata within milking parlors.

BACKGROUND OF THE INVENTION

Within milking parlors, milk is typically collected from animals by apparata which will be referred to herein as "milking siphons." The milking siphon bears several teat cups which attach the animal's teats, and lines leading to the teat cups apply vacuum to the teats to withdraw milk. Lines leading from the milking siphon transport the milk to a receptacle for collection and further processing.

In modern milking parlors, numerous stalls are provided to accommodate animals and provide spaces wherein they may be milked. If each stall is provided with its own milking siphon, this can incur significant cost and maintenance burdens, since each siphon will have its associated milk transport lines, pneumatic/electrical actuating mechanisms, and other such structure. Additionally, significant cleaning time is required to maintain the numerous milking siphons in a sanitary state. The use of individual milking siphons for each stall also gives rise to space problems, particularly in view of the large number of milk transport lines necessary to collect the milk and the desire to include as many milking stalls as possible within the milking parlor. The milking siphons must be maintained in an orderly and sanitary state for the sake of efficiency and easy maintenance, but this goal can be difficult to attain in view of the crowded state of most milking parlors and the unwieldy structure of most milking siphons, with their associated lines, teat cups, etc.

Owing to the foregoing concerns, numerous apparata have been developed to assist in the storage and use of milking siphons within milking parlors. One commonly used mechanism is a retractor, which mounts the milking siphon on a cable (or other link) which is in turn connected to a retraction mechanism such as a linear actuator (i.e., a pneumatic piston). The piston is extended when an animal is ready for milking, thereby situating the milking siphon adjacent to the animal, and the milking siphon is then connected to the animal's teats. When the animal has been completely milked—as may be detected by monitoring the pressure in the milk line leading from the milking siphon—the vacuum to the teats is halted so that the siphon drops off of the teats. The piston (or other retraction mechanism) then retracts to draw the milking siphon into a storage position. Examples of such apparata are given in U.S. Pat. No. 3,929,103 to Schluckbier and U.S. Pat. No. 3,931,794 to Chillingworth.

Other apparata have also been provided for easy relocation of milking siphons, and which also provide a support function so that a milking siphon may be more easily suspended off the ground and positioned in a variety of locations. These apparata are often provided as bars or articulated arms which maintain the milking siphon in a stored position outside a milking stall before an animal is placed therein, and which may then be extended into the stall after the animal has entered. The aforementioned U.S. Pat. No. 3,929,103 to Schluckbier illustrates an articulated arm used for this purpose (in combination with the aforementioned retractor mechanism), as does U.S. Pat. No. 3,938,470 to Pace.

Such apparata are useful, but tend to be complex, and thus more difficult to clean and maintain. There is therefore a need for milking siphon positioners for use within milking parlors which are easily cleaned and repaired, simple to install and operate, and which may allow positioning of milking siphons between different stalls if desired so as to allow a single milking siphon to be used in multiple locations, thereby decreasing costs and occupied space.

SUMMARY OF THE INVENTION

The invention, which is defined by the claims set out at the end of this disclosure, is directed to a milking siphon positioner wherein a swing arm is pivotally mounted within a bearing. The swing arm may swing in a swing arc defined in a plane which is at least substantially vertical. A milking siphon suitable for attachment to an animal's teats is carried on the swing arm so that it may be repositioned by the swing arm; for example, the swing arm may reposition the milking siphon to milking platforms situated on opposite sides of an aisle within a milking parlor, as in FIGS. 1 and 2 of the accompanying drawings. Locking means are provided which can selectively affix the swing arm with respect to the bearing, thereby allowing the swing arm to be affixed at selected angles in the swing arc (for example, in the positions shown in FIGS. 1 and 2). A preferred form of locking means is a locking wing extending downwardly from the bearing parallel to the plane of the swing arc, and having locking apertures defined in its body. A locking member is then mounted on the swing arm, and is selectively movable to engage one of the locking apertures in the locking wing and thereby restrain the swing arm from rotating with respect to the bearing. The locking member is preferably spring-biased so that it will normally tend to engage a locking aperture in the locking wing when it is situated adjacent to a locking aperture. Therefore, a user can simply actuate the locking member to release the swing arm with respect to the bearing, and can then freely swing the swing arm (and reposition the milking siphon) until the locking member encounters another locking aperture. When this occurs, the locking member will again automatically fix the swing arm with respect to the bearing.

The milking siphon is preferably affixed to the swing arm via a retractor, e.g., a pneumatic cylinder which extends and retracts the milking siphon on the swing arm. Thus, the milking siphon can be retracted while the swing arm is in motion, and can be extended for use when the swing arm is locked in place on the bearing. Preferably, the milking siphon is attached to the retractor via a flexible extension arm, such as a cable or flexible beam, so that the milking siphon is repositionable at the end of the swing arm. It is convenient to mount the retractor to the swing arm by brackets which have apertures defined therein so that hoses, wires, and other such structures extending down the swing arm to the milking siphon may be stored within the apertures in the brackets.

The milking siphon positioner is particularly useful in milking parlors using an arrangement such as the one illustrated in FIGS. 1–2, wherein milking platforms for animals are situated on opposite sides of an aisle where milking personnel travel. The milking personnel can engage and disengage the locking member (or other locking means) to swing the swing arm and milking siphon from one milking platform to the other. A single milking siphon may therefore be used to serve multiple milking stalls, and it is easily repositioned out of a stall (or the aisle) when desired.

Further advantages, features, and objects of the invention will be apparent from the following detailed description of the invention in conjunction with the associated drawings.

DETAILED DESCRIPTION OF THE PREFERRED EMBODIMENTS OF THE INVENTION

Figure 1:
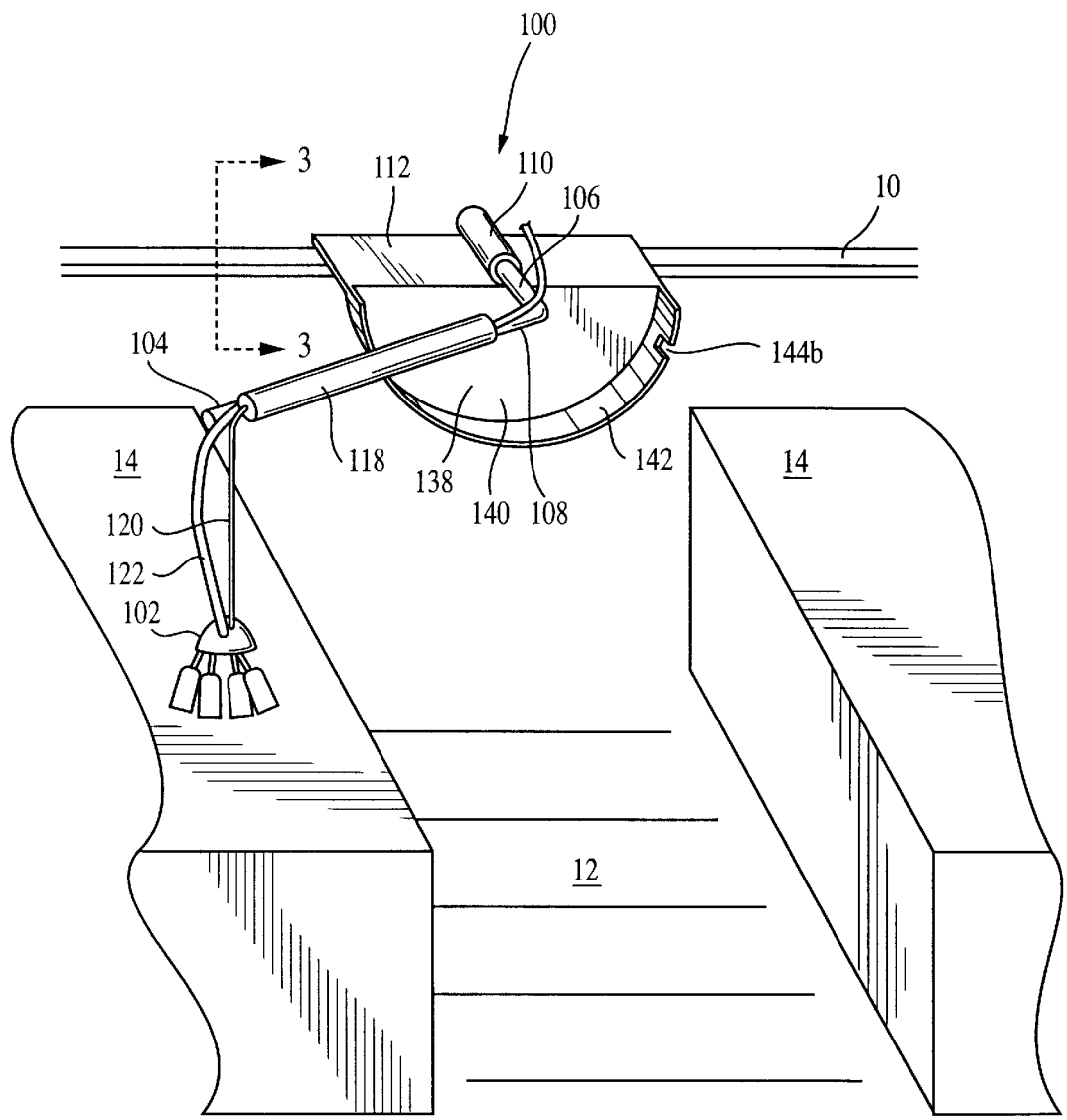
FIG. 1 is a front perspective view of the milking siphon positioner of the present invention situated above a milking platform at one side of an aisle of a milking parlor.
Figure 2:
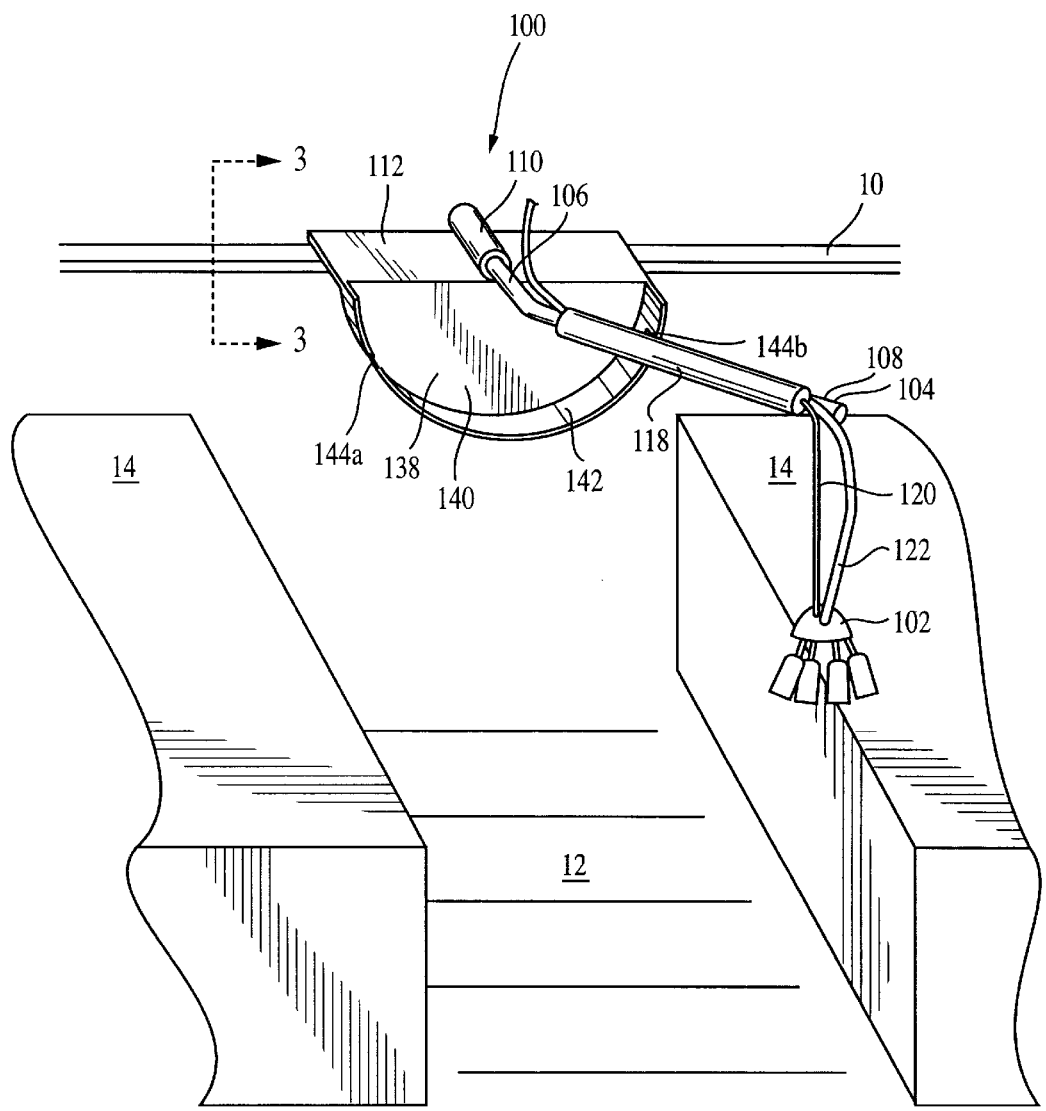
FIG. 2 is a front perspective view of the milking siphon positioner of FIG. 1 swung above the milking platform at the other side of the aisle of the milking parlor.

Referring to the drawings, particularly to FIGS. 1 and 2, a milking siphon positioner is designated generally by the reference numeral 100. The milking siphon positioner 100 is shown mounted on a support beam 10 situated above an aisle 12 of a milking parlor (the milking parlor not being fully shown), with the aisle 12 being located between a pair of milking platforms 14. In general, the aisle 12 and milking platforms 14 are elongated and extend for a substantial distance along the length of the milking parlor, but only short sections are illustrated in FIGS. 1 and 2. The support beam 10 preferably extends from the walls and/or ceiling of the building enclosing the milking parlor, and is preferably supported 5–7 feet off the floor of the aisle 12 so that milking personnel may walk down the aisle 12 without having their passage obstructed by the milking siphon positioner 100. However, the milking siphon positioner 100 is still easily reached by personnel standing in the aisle 12. Animals to be milked are then situated on the milking platforms 14, usually facing away from the aisle 12 so that their hind legs are closest to the aisle 12, though the animals could be oriented in other positions instead (e.g., facing down the aisle 12). As will be described at greater length below, milking personnel may walk along the aisle 12 and position the milking siphon 102 above one of the milking platforms 14 to milk an animal on one side of the aisle 12, e.g., with the milking siphon 102 being positioned as in FIG. 1. When milking of the animal is completed, the milking siphon 102 may be swung to the milking platform 14 at the other side of the aisle 12 to milk a second animal, e.g., as in FIG. 2.

Figure 3:
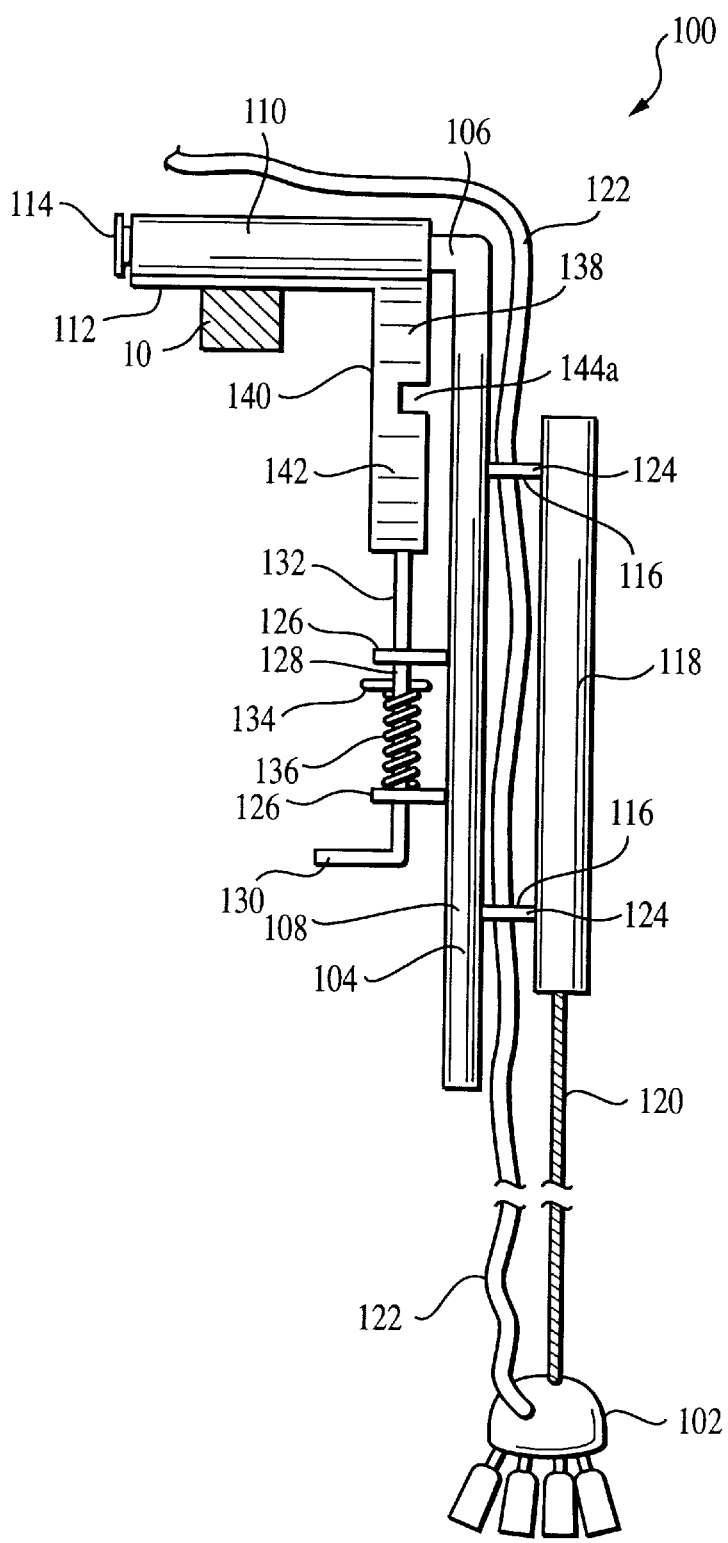
FIG. 3 is a partial side elevational view of the milking siphon positioner of FIGS. 1 and 2, shown from the line 3—3 in FIG. 1, and also shown with the swing arm of the positioner oriented substantially vertically (i.e., halfway between the positions of FIGS. 1 and 2).

Referring particularly to FIG. 3, a swing arm 104 is bent in dog-leg fashion to provide a horizontal swing arm portion 106 and a vertical swing arm portion 108. The horizontal swing arm portion 106 is pivotally mounted within a tubular bearing 110 situated on a support plate 112, which is in turn supported on the support beam 10. The horizontal swing arm portion 106 of the swing arm 104 is prevented from falling out of the bearing 110 by use of a stop 114 situated at one its ends, and also by the vertical swing arm portion 108 extending from its other end. As a result, the horizontal swing arm portion 106 is restrained from substantial movement in its longitudinal direction and cannot fall out of the bearing 110.

The vertical swing arm portion 108 has a pair of retractor brackets 116 extending therefrom and connecting to a retractor 118 for withdrawing the milking siphon 102, with the retractor 118 being illustrated as a linear actuator (e.g., a pneumatic cylinder). An extension arm 120, e.g., a cable, extends from the linear actuator 118 to connect to the milking siphon 102. As a result, extension and retraction of a piston (not shown) within the linear actuator 118 extends and withdraws the cable 120, and thus the milking siphon 102 as well. It is noted that while a pneumatic cylinder linear actuator 118 is illustrated, air supply lines and related connections are not shown in the Figures.

As best illustrated in FIG. 3, a milk supply line 122 for transporting milk from the milking siphon 102 extends upwardly around (or through) the retractor brackets 116, and up the length of the vertical swing arm portion 108. The milk supply line 122 may then extend away (e.g., along the support beam 10) towards a main milk collection line or milk collection receptacle. Depending on the type of milking siphon 102 being used, it may have other lines, hoses, or connections beyond those shown in the Figures (e.g., an air supply line for pneumatic actuation of the milking siphon 102), and if these are provided, they may (if appropriate) be bundled with the milk supply line 122 to extend up the vertical swing arm portion 108. It is particularly advantageous to provide apertures 124 in the retractor brackets 116 (these apertures 124 being shown in phantom/hidden lines in FIG. 3) wherein the milk supply line 122 and/or other cables/lines may be stored as they extend up the vertical swing arm portion 108.

Since the milking siphon positioner 100 will be used to swing the milking siphon 102 on the swing arm 104 between the opposing milking platforms 14, it is preferable to provide a locking means whereby the swing arm 104 can be selectively locked with respect to the bearing 110 to prevent the swing arm 104 from swinging, and to allow the milking siphon 102 to be more easily fixed in a desired location. Referring particularly to FIG. 3, on the side of the vertical swing arm portion 108 opposite the linear actuator 118, plate-like locking brackets 126 extend outwardly towards the vertical plane in which the support beam 10 rests. The locking brackets 126 bear apertures (not shown) through which a locking member 128 extends. The locking member 128 includes a locking member handle portion 130 and an elongated locking member engagement portion 132. The locking member engagement portion 132 extends through the locking brackets 126 in a direction oriented generally parallel to the vertical swing arm portion 108, and the locking member handle portion 130 preferably extends substantially perpendicularly out from the locking member engagement portion 132 to provide a handle which may be easily grasped by a user. Between the locking brackets 126, a pin 134 extends through the locking member engagement portion 132, and a spring 136 is interposed between the pin 134 and one of the locking brackets 126 in such a manner that the spring 136 acts on the pin 134 and locking bracket 126 to spring-bias the locking member engagement portion 132 towards the bearing 110.

Further structure is then provided so that the locking member 128 may engage the swing arm 104 with respect to the bearing 110. Again referring to FIG. 3, beneath the bearing 110, a locking wing 138 extends downwardly from the support plate 112 across a portion of a plane parallel to the plane in which the swing arm 104 swings. As best shown in FIGS. 1 and 2, the locking wing 138 preferably has a semicircular shape (or other arcuate shape), and it spans at least a substantial portion of the arc that the swing arm 104 traverses. The structure of the locking wing 138 includes a wing plate 140 and a locking flange 142, wherein the locking flange 142 extends outwardly from the wing plate 140 and extends across at least a portion of the arc through which the swing arm 104 travels. The locking flange 142 bears apertures 144a and 144b therein, with aperture 144a being shown in FIG. 1 and aperture 144b being shown in FIGS. 2 and 3. Referring to FIG. 3, owing to the spring-biasing of the locking member engagement portion 132 towards the bearing 110, the locking member engagement portion 132 will ride against the locking flange 142 as the swing arm 104 rotates, and will extend into the locking apertures 144a and 144b when they are encountered. Thus, whereas FIGS. 1 and 2 illustrate the swing arm 104 in locked positions wherein the locking member engagement portion 132 engages the locking apertures 144a and 144b in the locking wing 138 (more specifically, in its locking flange 142), FIG. 3 illustrates the swing arm 104 in an intermediate position with the swing arm 104 extending substantially vertically, and with the locking member engagement portion 132 bearing against the locking flange 142. Note that FIG. 3 illustrates the retractor cable 120 in an extended state, but during standard usage, the retractor cable 120 will generally only be extended when the swing arm 104 is in the locked positions of FIGS. 1 and 2, and will otherwise be withdrawn so the milking siphon 102 is pulled in close proximity to the swing arm 104.

While in use, several milking siphon positioners 100 may be situated as shown in FIGS. 1–2, with the positioners 100 being spaced in parallel relation along the length of a milking parlor aisle 12. Animals on one of the milking platforms 14 may be milked by locating the milking siphon 102 at that platform 14 by use of the milking siphon positioner 100 (as in FIG. 1). When milking is complete, the linear actuator 118 can be activated to withdraw the cable 120 and thereby pull the milking siphon 102 towards the swing arm 104. The user can then grasp and pull the locking member handle portion 130 to disengage the locking member engagement portion 132 from the locking aperture 144a. The swing arm 104 can then be swung to the other milking platform 14 (as in FIG. 2) until the locking member engagement portion 132 is driven by the spring 136 to automatically engage the locking aperture 144b. As the locking member engagement portion 132 travels between the locking apertures 144a and 144b, it need not be held by the user in a retracted position and it may simply bear against the locking flange 142 of the locking wing 138, and it will automatically engage a locking aperture when it is encountered.

It should be understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, other forms of bearings 110 for rotatably supporting the swing arm 104 may be used, e.g., ball-and-socket joints, hinges, and other structures which allow pivotal movement. Further, the swing arm 104 need not be permanently situated within the bearing 110, and may be made removable for easier later maintenance; for example, the stop 114 at the end of the horizontal swing arm portion 106 in FIG. 3 could instead be replaced by a pin or other structure which is removably inserted within the horizontal swing arm portion 106, and which may be removed to allow removal of the horizontal swing arm portion 106 from the bearing 110.

Second, the locking wing 138 need not take the semicircular form illustrated in FIGS. 1–2, and may instead take a variety of forms suitable for allowing selective locking of the swing arm 104 with respect to the bearing 110. As a first example, the locking flange 142 may be omitted, and the locking apertures 144a and 144b may be formed in the circumference of the wing plate 140 (e.g., as notches therein). As a second example, the locking apertures 144a and 144b could be formed in the wing plate 140 at points spaced away from its circumference. In this case, the locking member 128 can be modified so that its locking member engagement portion 132 extends horizontally inwardly and outwardly to engage and disengage the locking apertures. As a third example, the locking wing 138 need not include a plate-like structure; instead, the locking wing 138 could simply be formed as one or more pipes or channels which extend radially outwardly from the bearing 110, so that their interiors provide locking apertures for engagement by the locking member 128. Alternatively, such pipes or channels can extend from the support beam 10 to provide the locking apertures, in which case the support beam 10 would essentially constitute part of the locking wing 138. As a fifth example, the bearing 110 could include locking apertures defined about its circumference, and the locking member 128 could simply engage these apertures. It should therefore be understood that a wide variety of structures for affixing the swing arm 104 in a fixed angular position with respect to the bearing 110 are possible, with the version of FIGS. 1–3 merely being a particularly preferred one.

Third, it is noted that the retractor 118 is not a necessary part of the invention, though it is preferable. Further, the retractor 118 can be provided in forms other than a pneumatic cylinder, e.g., a hydraulic cylinder, an electromagnetically-driven slide, a worm screw, a rack-and-pinion mechanism, or any other types of linear actuators appropriate for allowing retraction of the milking siphon 102. Further, the retractor 118 could be provided in a form other than a linear actuator—e.g., a servomotor driving a spool whereupon the retractor cable 120 is located—though a linear actuator is preferred because it will generally be more compact when mounted on the swing arm 104.

The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A milking siphon positioner comprising:
   a. a bearing suspended above a floor;
   b. a swing arm rotatably borne within the bearing to swing across a swing arc above the floor, the swing arc being defined within a plane which is at least substantially vertical, whereby the swing arm may swing beneath the bearing and between opposing sides of the bearing;
   c. a milking siphon carried on the swing arm;
   d. locking means associated with the swing arm for selectively affixing the swing arm with respect to the bearing, whereby the swing arm can be affixed in at least one selected angle in the swing arc.

2. The milking siphon positioner of claim 1 wherein the locking means comprises:
   a. a locking wing extending from the bearing, the locking wing having one or more locking apertures therein;
   b. a locking member connected to the swing arm, the locking member being movable into one of the locking apertures to engage the locking wing.

3. The milking siphon positioner of claim 2 wherein the locking member is spring-biased to engage one of the locking apertures once the locking member is adjacent to this locking aperture.

4. The milking siphon positioner of claim 2 wherein the locking wing is defined by a wing plate situated within a plane parallel to the plane of the swing arc.

5. The milking siphon positioner of claim 4 wherein the wing plate has a locking flange extending outwardly therefrom, the locking flange having the one or more locking apertures defined therein.

6. The milking siphon positioner of claim 5 wherein
the wing plate has a lower side from which the locking flange extends, and an opposing upper side;
the lower side at least partially defines an arcuate path.

7. The milking siphon positioner of claim 6 wherein the bearing is situated above the upper side of the wing plate.

8. The milking siphon positioner of claim 1 further comprising a linear actuator on the swing arm, the linear actuator bearing an extension arm which is extendible and retractable with respect to the swing arm, wherein the milking siphon is connected to the extension arm.

9. The milking siphon positioner of claim 8 wherein the linear actuator is connected to the swing arm by a bracket through which a milk hose extends, the milk hose being connected to the milking siphon.

10. The milking siphon positioner of claim 1 wherein the floor is situated between two opposing raised milking platforms whereon animals to be milked may be situated, and wherein the swing arc is at least partially defined between the milking platforms.

11. A milking siphon positioner comprising:
a. a locking wing having one or more locking apertures defined therein;
b. a bearing situated in a fixed position with respect to the locking wing;
c. a swing arm rotatably mounted within the bearing, the swing arm being rotatable within the bearing to swing in a swing arc defined in a plane which is at least substantially vertical and which is situated below a horizontal plane wherein the bearing is located;
d. a locking member borne on the swing arm, the locking member being movable to engage one of the locking apertures in the locking wing and thereby restrain the swing arm from rotating with respect to the bearing;
e. a milking siphon affixed to the swing arm.

12. The milking siphon positioner of claim 11 wherein
the locking wing has opposing upper and lower surfaces,
the upper surface has the bearing affixed thereon, and
the lower surface has the one or more locking apertures defined therein.

13. The milking siphon positioner of claim 12 wherein the lower surface includes a locking flange protruding therefrom, and wherein the locking apertures are defined in the locking flange.

14. A milking siphon positioner comprising:
a. a locking wing having an upper side and an opposing lower side;
b. a bearing affixed to the locking wing;
c. an elongated swing arm rotatably mounted within the bearing to swing in a swing arc traversing at least a portion of the lower side of the locking wing;
d. a locking member affixed to the swing arm, the locking member being selectively movable to engage the lower side of the locking wing;
e. a milking siphon borne on the swing arm.

15. The milking siphon positioner of claim 14 wherein the lower side of the locking wing includes a locking flange extending therefrom, the locking flange including at least one locking aperture defined therein into which the locking member may extend to thereby engage the locking flange.

16. The milking siphon positioner of claim 14 wherein the locking member is spring-biased to engage the lower side of the locking wing.

17. The milking siphon positioner of claim 16 wherein the locking member is elongated and extends at least substantially parallel to the swing arm between a first end and a second end, and wherein the locking member is slidable along the length of the swing arm to have its second end engage the lower side of the locking wing.

18. The milking siphon positioner of claim 16 wherein the bearing is situated on the upper side of the locking wing, and the lower side of the locking wing at least partially defines an arcuate path.

19. The milking siphon positioner of claim 14 further comprising a linear actuator on the swing arm, the linear actuator bearing an extension arm which is extendible and retractable with respect to the swing arm, wherein the milking siphon is connected to the extension arm.

20. The milking siphon positioner of claim 19 wherein the linear actuator is connected to the swing arm by a bracket through which a milk hose extends, the milk hose being connected to the milking siphon.

* * * * *